(12) United States Patent
Chheda et al.

(10) Patent No.: US 8,607,209 B2
(45) Date of Patent: Dec. 10, 2013

(54) ENERGY-FOCUSED COMPILER-ASSISTED BRANCH PREDICTION

(75) Inventors: Saurabh Chheda, Santa Clara, CA (US); Kristopher Carver, Chicopee, MA (US); Raksit Ashok, Sunnyvale, CA (US)

(73) Assignee: BlueRISC Inc., Amherst, MA (US)

( * ) Notice: Subject to any disclaimer, the term of this patent is extended or adjusted under 35 U.S.C. 154(b) by 1127 days.

(21) Appl. No.: 11/037,663

(22) Filed: Jan. 18, 2005

(65) Prior Publication Data

US 2005/0172277 A1    Aug. 4, 2005

Related U.S. Application Data

(60) Provisional application No. 60/541,875, filed on Feb. 4, 2004.

(51) Int. Cl.
*G06F 9/45* (2006.01)
*G06F 9/30* (2006.01)
*G06F 9/44* (2006.01)

(52) U.S. Cl.
USPC ........... 717/158; 717/151; 712/208; 712/213; 712/233; 712/237

(58) Field of Classification Search
USPC ................. 717/158, 120–127, 131, 151, 161; 712/207–212, 233–240
See application file for complete search history.

(56) References Cited

U.S. PATENT DOCUMENTS

| | | |
|---|---|---|
| 3,603,934 A | 9/1971 | Heath, Jr. et al. |
| 4,003,033 A | 1/1977 | O'Keefe et al. |
| 4,037,090 A | 7/1977 | Raymond |
| 4,042,972 A | 8/1977 | Grunes et al. |
| 4,050,058 A | 9/1977 | Garlic |
| 4,067,059 A | 1/1978 | Derchak |
| 4,079,455 A | 3/1978 | Ozga |
| 4,101,960 A | 7/1978 | Stokes et al. |
| 4,110,822 A | 8/1978 | Porter |
| 4,125,871 A | 11/1978 | Martin |
| 4,128,873 A | 12/1978 | Lamiaux |
| 4,138,720 A | 2/1979 | Chu et al. |
| 4,181,942 A | 1/1980 | Forster et al. |
| 4,255,785 A | 3/1981 | Chamberlin et al. |

(Continued)

FOREIGN PATENT DOCUMENTS

| | | |
|---|---|---|
| EP | 0314277 | 5/1989 |
| EP | 0552816 | 7/1993 |

(Continued)

OTHER PUBLICATIONS

Ramirez et al. "Branch Prediction Using Profile Data", 2001, Sprint-Verlag Berlin Heideberg 2001, pp. 386-394.*

(Continued)

*Primary Examiner* — Don Wong
*Assistant Examiner* — Marina Lee
(74) *Attorney, Agent, or Firm* — Fish & Richardson P.C.

(57) ABSTRACT

A processor framework includes a compiler to add control information to an instruction sequence at compile time. The control information is added in the instruction sequence prior to a control-flow changing instruction. Microarchitecture is configured to use the control information at runtime to predict an outcome of the control-flow changing instruction prior to fetching the control-flow changing instruction.

50 Claims, 2 Drawing Sheets

(56) References Cited

U.S. PATENT DOCUMENTS

| | | | |
|---|---|---|---|
| 4,354,228 | A | 10/1982 | Moore et al. |
| 4,376,977 | A | 3/1983 | Bruinshorst |
| 4,382,279 | A | 5/1983 | Mgon |
| 4,403,303 | A | 9/1983 | Howes et al. |
| 4,410,939 | A | 10/1983 | Kawakami |
| 4,434,461 | A | 2/1984 | Puhl |
| 4,435,758 | A | 3/1984 | Lorie et al. |
| 4,450,519 | A | 5/1984 | Guttag et al. |
| 4,463,421 | A | 7/1984 | Laws |
| 4,538,239 | A | 8/1985 | Magar |
| 4,541,045 | A | 9/1985 | Kromer |
| 4,562,537 | A | 12/1985 | Barnett et al. |
| 4,577,282 | A | 3/1986 | Caudel et al. |
| 4,592,013 | A | 5/1986 | Prame |
| 4,604,695 | A | 8/1986 | Widen et al. |
| 4,607,332 | A | 8/1986 | Goldberg |
| 4,626,988 | A | 12/1986 | George et al. |
| 4,649,471 | A | 3/1987 | Briggs |
| 4,665,495 | A | 5/1987 | Thaden |
| 4,679,140 | A | 7/1987 | Gotou et al. |
| 4,709,329 | A | 11/1987 | Hecker |
| 4,713,749 | A | 12/1987 | Magar et al. |
| 4,714,994 | A | 12/1987 | Oklobdzija et al. |
| 4,720,812 | A | 1/1988 | Kao et al. |
| 4,772,888 | A | 9/1988 | Kimura |
| 4,773,038 | A | 9/1988 | Hillis et al. |
| 4,777,591 | A | 10/1988 | Chang et al. |
| 4,787,032 | A | 11/1988 | Culley et al. |
| 4,803,621 | A | 2/1989 | Kelly |
| 4,860,198 | A | 8/1989 | Takenaka |
| 4,870,562 | A | 9/1989 | Kimoto |
| 4,873,626 | A | 10/1989 | Gifford |
| 4,931,986 | A | 6/1990 | Daniel et al. |
| 4,992,933 | A | 2/1991 | Taylor |
| 5,021,993 | A | 6/1991 | Matoba et al. |
| 5,036,460 | A | 7/1991 | Takahira et al. |
| 5,038,282 | A | 8/1991 | Gilbert et al. |
| 5,045,995 | A | 9/1991 | Levinthal et al. |
| 5,070,451 | A | 12/1991 | Moore et al. |
| 5,111,389 | A | 5/1992 | McAuliffe et al. |
| 5,121,498 | A | 6/1992 | Gilbert et al. |
| 5,127,091 | A | 6/1992 | Boufarah |
| 5,136,697 | A | 8/1992 | Johnson |
| 5,193,202 | A | 3/1993 | Jackson et al. |
| 5,224,214 | A | 6/1993 | Rosich |
| 5,230,079 | A | 7/1993 | Grondalski |
| 5,276,895 | A | 1/1994 | Grondalski |
| 5,361,367 | A | 11/1994 | Fijany et al. |
| 5,410,669 | A | 4/1995 | Biggs et al. |
| 5,430,854 | A | 7/1995 | Sprague et al. |
| 5,440,749 | A | 8/1995 | Moore et al. |
| 5,454,087 | A * | 9/1995 | Narita et al. .................. 712/240 |
| 5,479,624 | A | 12/1995 | Lee |
| 5,481,684 | A | 1/1996 | Richter et al. |
| 5,481,693 | A | 1/1996 | Blomgren et al. |
| 5,497,478 | A | 3/1996 | Murata |
| 5,524,223 | A | 6/1996 | Lazaravich et al. |
| 5,542,059 | A | 7/1996 | Blomgren |
| 5,542,074 | A | 7/1996 | Kim et al. |
| 5,551,039 | A | 8/1996 | Weinberg et al. |
| 5,555,386 | A | 9/1996 | Nomura |
| 5,555,428 | A | 9/1996 | Radigan et al. |
| 5,560,028 | A * | 9/1996 | Sachs et al. .................. 712/23 |
| 5,579,520 | A | 11/1996 | Bennett |
| 5,590,283 | A | 12/1996 | Hillis et al. |
| 5,590,356 | A | 12/1996 | Gilbert |
| 5,598,546 | A * | 1/1997 | Blomgren .................. 712/209 |
| 5,604,913 | A | 2/1997 | Koyanagi et al. |
| 5,608,886 | A | 3/1997 | Blomgren et al. |
| 5,630,143 | A | 5/1997 | Maher et al. |
| 5,637,932 | A | 6/1997 | Koreeda et al. |
| 5,638,525 | A | 6/1997 | Hammond et al. |
| 5,638,533 | A | 6/1997 | Law |
| 5,652,894 | A | 7/1997 | Hu et al. |
| 5,655,122 | A * | 8/1997 | Wu .................. 717/152 |
| 5,655,124 | A | 8/1997 | Lin |
| 5,659,722 | A | 8/1997 | Blaner et al. |
| 5,659,778 | A | 8/1997 | Gingold et al. |
| 5,664,950 | A | 9/1997 | Lawrence |
| 5,666,519 | A | 9/1997 | Hayden |
| 5,684,973 | A | 11/1997 | Sullivan et al. |
| 5,696,958 | A | 12/1997 | Mowry et al. |
| 5,704,053 | A | 12/1997 | Santhanam |
| 5,717,440 | A * | 2/1998 | Katsura et al. .................. 345/558 |
| 5,721,893 | A | 2/1998 | Holler et al. |
| 5,727,229 | A | 3/1998 | Kan et al. |
| 5,737,572 | A | 4/1998 | Nunziata |
| 5,737,749 | A | 4/1998 | Patel et al. |
| 5,742,804 | A * | 4/1998 | Yeh et al. .................. 712/237 |
| 5,752,068 | A | 5/1998 | Gilbert |
| 5,752,069 | A * | 5/1998 | Roberts et al. .................. 712/23 |
| 5,758,112 | A | 5/1998 | Yeager et al. |
| 5,758,176 | A | 5/1998 | Agarwal et al. |
| 5,774,685 | A * | 6/1998 | Dubey .................. 712/205 |
| 5,774,686 | A | 6/1998 | Hammond et al. |
| 5,778,241 | A | 7/1998 | Bindloss et al. |
| 5,781,750 | A | 7/1998 | Blomgren et al. |
| 5,790,877 | A | 8/1998 | Nishiyama et al. |
| 5,794,062 | A | 8/1998 | Baxter |
| 5,805,907 | A | 9/1998 | Loper |
| 5,805,915 | A | 9/1998 | Wilkinson et al. |
| 5,812,811 | A | 9/1998 | Dubey et al. |
| 5,822,606 | A | 10/1998 | Morton |
| 5,848,290 | A | 12/1998 | Yoshida et al. |
| 5,854,934 | A | 12/1998 | Hsu et al. |
| 5,857,104 | A * | 1/1999 | Natarjan et al. .................. 717/158 |
| 5,864,697 | A | 1/1999 | Shiell |
| 5,864,707 | A * | 1/1999 | Tran et al. .................. 712/23 |
| 5,870,581 | A | 2/1999 | Redford |
| 5,872,987 | A | 2/1999 | Wade et al. |
| 5,875,324 | A | 2/1999 | Tran et al. |
| 5,875,464 | A | 2/1999 | Kirk |
| 5,884,057 | A | 3/1999 | Blomgren et al. |
| 5,887,166 | A | 3/1999 | Mallick et al. |
| 5,903,750 | A | 5/1999 | Yeh et al. |
| 5,924,117 | A | 7/1999 | Luick |
| 5,930,490 | A | 7/1999 | Bartkowiak |
| 5,930,509 | A | 7/1999 | Yates et al. |
| 5,933,650 | A | 8/1999 | van Hook et al. |
| 5,933,860 | A | 8/1999 | Emer et al. |
| 5,946,222 | A | 8/1999 | Redford |
| 5,949,995 | A * | 9/1999 | Freeman .................. 712/239 |
| 5,960,467 | A | 9/1999 | Mahalingaiah et al. |
| 5,966,544 | A | 10/1999 | Sager |
| 5,991,857 | A | 11/1999 | Koetje et al. |
| 5,996,061 | A | 11/1999 | Lopez-Aguado et al. |
| 6,006,328 | A | 12/1999 | Drake |
| 6,021,484 | A | 2/2000 | Park |
| 6,044,469 | A | 3/2000 | Horstmann |
| 6,049,330 | A | 4/2000 | Redford |
| 6,052,703 | A | 4/2000 | Redford |
| 6,058,469 | A | 5/2000 | Baxter |
| 6,067,609 | A | 5/2000 | Meeker et al. |
| 6,067,622 | A | 5/2000 | Moore |
| 6,076,158 | A | 6/2000 | Sites et al. |
| 6,078,745 | A | 6/2000 | De Greef et al. |
| 6,089,460 | A | 7/2000 | Hazama |
| 6,105,139 | A | 8/2000 | Dey et al. |
| 6,108,775 | A | 8/2000 | Shiell et al. |
| 6,119,205 | A | 9/2000 | Wicki et al. |
| 6,121,905 | A | 9/2000 | Redford |
| 6,130,631 | A | 10/2000 | Redford |
| 6,175,892 | B1 | 1/2001 | Sazzad et al. |
| 6,178,498 | B1 * | 1/2001 | Sharangpani et al. .................. 712/239 |
| 6,211,864 | B1 | 4/2001 | Redford |
| 6,212,542 | B1 | 4/2001 | Kahle et al. |
| 6,216,223 | B1 | 4/2001 | Revilla et al. |
| 6,219,796 | B1 | 4/2001 | Bartley |
| 6,256,743 | B1 | 7/2001 | Lin |
| 6,263,427 | B1 | 7/2001 | Cummins et al. |
| 6,272,512 | B1 | 8/2001 | Golliver et al. |
| 6,272,676 | B1 | 8/2001 | Haghighat |
| 6,282,623 | B1 | 8/2001 | Halahmi et al. |
| 6,282,628 | B1 | 8/2001 | Dubey et al. |

(56) References Cited

U.S. PATENT DOCUMENTS

| | | |
|---|---|---|
| 6,282,639 B1 | 8/2001 | Puziol et al. |
| 6,282,879 B1 | 9/2001 | Fong |
| 6,286,135 B1 | 9/2001 | Santhanam |
| 6,289,505 B1 | 9/2001 | Goebel |
| 6,301,705 B1 | 10/2001 | Doshi et al. |
| 6,327,661 B1 | 12/2001 | Kocher et al. |
| 6,334,175 B1 | 12/2001 | Chih |
| 6,341,371 B1 | 1/2002 | Tandri |
| 6,381,668 B1 | 4/2002 | Lunteren |
| 6,385,720 B1 | 5/2002 | Tanaka et al. |
| 6,393,520 B2 | 5/2002 | Yoshikawa |
| 6,404,439 B1 | 6/2002 | Coulombe et al. |
| 6,412,105 B1 | 6/2002 | Maslennikov |
| 6,430,674 B1 | 8/2002 | Trivedi et al. |
| 6,430,693 B2 | 8/2002 | Lin |
| 6,446,181 B1 | 9/2002 | Ramagopal et al. |
| 6,452,864 B1 | 9/2002 | Condemi et al. |
| 6,473,339 B2 | 10/2002 | De Ambroggi et al. |
| 6,477,639 B1* | 11/2002 | Krishnan et al. ............ 712/237 |
| 6,477,646 B1 | 11/2002 | Krishna et al. |
| 6,487,640 B1 | 11/2002 | Lipasti |
| 6,487,651 B1 | 11/2002 | Jackson et al. |
| 6,502,188 B1 | 12/2002 | Zuraski, Jr. et al. |
| 6,523,110 B1* | 2/2003 | Bright et al. ................. 712/239 |
| 6,529,943 B1 | 3/2003 | Ohi |
| 6,539,543 B1 | 3/2003 | Guffens |
| 6,550,004 B1* | 4/2003 | Henry et al. ................. 712/239 |
| 6,560,776 B1 | 5/2003 | Breggin et al. |
| 6,571,331 B2* | 5/2003 | Henry et al. ................. 712/239 |
| 6,574,740 B1 | 6/2003 | Odaohhara |
| 6,601,161 B2* | 7/2003 | Rappoport et al. .......... 712/238 |
| 6,604,190 B1* | 8/2003 | Tran ............................. 712/207 |
| 6,611,910 B2* | 8/2003 | Sharangpani et al. ....... 712/237 |
| 6,625,740 B1 | 9/2003 | Datar |
| 6,643,739 B2 | 11/2003 | Van de Waerdt et al. |
| 6,658,578 B1 | 12/2003 | Laurenti et al. |
| 6,671,798 B1 | 12/2003 | Puziol et al. |
| 6,675,305 B1 | 1/2004 | Mohammad |
| 6,687,838 B2 | 2/2004 | Orenstien et al. |
| 6,732,253 B1 | 5/2004 | Redford |
| 6,772,323 B2* | 8/2004 | Krishnan et al. ............ 712/234 |
| 6,795,781 B2 | 9/2004 | Aldridge et al. |
| 6,813,693 B2 | 11/2004 | Chilimbi |
| 6,823,447 B2* | 11/2004 | Hay et al. .................... 712/239 |
| 6,826,652 B1 | 11/2004 | Chauvel et al. |
| 6,931,518 B1 | 8/2005 | Redford |
| 6,934,865 B2 | 8/2005 | Moritz et al. |
| 6,970,985 B2 | 11/2005 | Moritz et al. |
| 6,988,183 B1 | 1/2006 | Wong |
| 7,024,393 B1 | 4/2006 | Peinado et al. |
| 7,036,118 B1 | 4/2006 | Ulery et al. |
| 7,080,366 B2 | 7/2006 | Kramskoy et al. |
| 7,089,594 B2 | 8/2006 | Lal et al. |
| 7,162,617 B2 | 1/2007 | Ota et al. |
| 7,185,215 B2 | 2/2007 | Cook et al. |
| 7,278,136 B2* | 10/2007 | Moritz et al. ................. 717/152 |
| 7,293,164 B2* | 11/2007 | DeWitt et al. ................ 712/240 |
| 7,299,500 B1 | 11/2007 | Klebe et al. |
| 7,367,022 B2* | 4/2008 | Lueh et al. .................... 717/151 |
| 7,430,670 B1 | 9/2008 | Horning et al. |
| 7,467,377 B2 | 12/2008 | Wu et al. |
| 7,487,340 B2* | 2/2009 | Luick .......................... 712/239 |
| 7,493,607 B2 | 2/2009 | Moritz |
| 7,564,345 B2 | 7/2009 | Devadas et al. |
| 7,600,265 B2 | 10/2009 | Davydov et al. |
| 7,613,921 B2 | 11/2009 | Scaralata |
| 7,639,805 B2 | 12/2009 | Li et al. |
| 7,676,661 B1 | 3/2010 | Mohan et al. |
| 7,996,671 B2* | 8/2011 | Chheda et al. ............... 713/164 |
| 2001/0032309 A1* | 10/2001 | Henry et al. ................. 712/239 |
| 2001/0044891 A1 | 11/2001 | McGrath |
| 2001/0056531 A1 | 12/2001 | McFarling |
| 2002/0073301 A1* | 6/2002 | Kahle et al. .................. 712/235 |
| 2002/0095566 A1* | 7/2002 | Sharangpani et al. ....... 712/239 |
| 2002/0104077 A1* | 8/2002 | Charnell et al. ............. 717/162 |
| 2002/0116578 A1 | 8/2002 | Sakai et al. |
| 2002/0157000 A1* | 10/2002 | Hay et al. ..................... 712/239 |
| 2003/0014742 A1 | 1/2003 | Seth et al. |
| 2003/0041230 A1* | 2/2003 | Rappoport et al. .......... 712/238 |
| 2003/0066061 A1* | 4/2003 | Wu et al. ...................... 717/158 |
| 2003/0204705 A1* | 10/2003 | Oldfield et al. .............. 712/207 |
| 2004/0003217 A1* | 1/2004 | Ukai ............................. 712/239 |
| 2004/0010679 A1* | 1/2004 | Moritz et al. ..................... 713/1 |
| 2004/0010782 A1 | 1/2004 | Moritz et al. |
| 2004/0010783 A1 | 1/2004 | Moritz et al. |
| 2004/0015923 A1 | 1/2004 | Hemsing et al. |
| 2004/0049769 A1* | 3/2004 | Lueh et al. .................... 717/158 |
| 2004/0139340 A1 | 7/2004 | Johnson et al. |
| 2004/0154011 A1 | 8/2004 | Wang et al. |
| 2004/0158691 A1 | 8/2004 | Redford |
| 2004/0162964 A1 | 8/2004 | Ota et al. |
| 2004/0205740 A1 | 10/2004 | Lavery et al. |
| 2005/0055678 A1 | 3/2005 | Sakai |
| 2005/0066153 A1* | 3/2005 | Sharangpani et al. ........ 712/239 |
| 2005/0108507 A1 | 5/2005 | Chheda et al. |
| 2005/0114850 A1 | 5/2005 | Chheda et al. |
| 2005/0154867 A1* | 7/2005 | DeWitt et al. ................. 712/239 |
| 2005/0172277 A1 | 8/2005 | Chheda et al. |
| 2005/0210249 A1 | 9/2005 | Lee et al. |
| 2005/0262332 A1* | 11/2005 | Rappoport et al. .......... 712/239 |
| 2006/0179329 A1 | 8/2006 | Terechko et al. |
| 2006/0190710 A1* | 8/2006 | Rychlik ....................... 712/240 |
| 2007/0294181 A1 | 12/2007 | Chheda et al. |
| 2008/0126766 A1 | 5/2008 | Moritz et al. |
| 2009/0300590 A1 | 12/2009 | Moritz |

FOREIGN PATENT DOCUMENTS

| | | |
|---|---|---|
| EP | 0679991 | 11/1995 |
| EP | 0945783 | 9/1999 |
| EP | 0681236 | 11/2000 |
| GB | 2201015 | 8/1988 |
| JP | 10-289305 | 10/1998 |
| JP | 2002-7359 | 1/2002 |
| WO | WO87/00318 | 1/1987 |
| WO | WO91/19269 | 12/1991 |
| WO | WO93/04438 | 3/1993 |
| WO | WO99/14685 | 3/1999 |
| WO | WO02/39271 | 5/2002 |
| WO | WO02/39272 | 5/2002 |
| WO | WO02/44895 | 6/2002 |
| WO | WO02/46885 | 6/2002 |
| WO | WO04/006060 | 1/2004 |

OTHER PUBLICATIONS

Young et al. "Improving the Accuracy of Static Branch Prediction Using Branch Correlation", 1994, ACM, pp. 232-241.*

Desmet et al., "Improved Static Branch Prediction for Weak Dynamic Predictions", retrieved from <http://escher.elis.ugent.be/publ/Edocs/DOC/P103_085.pdf>, available on line database on Sep 24, 2003, p. 1-3.*

Abraham et al., "Automatic and Efficient Evaluation of Memory Hierarchies for Embedded Systems," micro, p. 114, 32nd Annual IEEE/ACM International Symposium on Microarchitecture (MICRO'99), 1999.

Advanced Micro Devices, Inc., "Quantispeed Architecture", AMD White Paper, Sunnyvale, CA, (2001).

Akkar et al., "An Implementation of DES and AES, Secure Against Some Attacks", CHES2001, LNCS 2162, pp. 309-318 (2001).

Albonesi et al., "Selective Cache Ways: On-Demand Cache Resource Allocation", Proceedings of the 32nd International Symposium on Microarchitecture, pp. 248-259 (Nov. 1999).

Al-Tawil, K. et al. "Performance Modeling and Evaluation of MPI", Journal of Parallel and Distributed Computing, vol. 61, pp. 202-223, 2001.

Anderson et al., "Physical Design of a Fourth-Generation POWER GHz Microprocessor", Digest of Technical Papers, IEEE Int'l Solid State Circuits Conf., pp. 232-233 and 451 (2001).

Andersen, L., "Program Analysis and Specialization for the C Programming Language", Ph.D. Thesis, DIKU, Univ. of Copenhagen (May 1994).

(56) References Cited

OTHER PUBLICATIONS

Aragon, et al., "Power-aware Control Speculation Through Selective Throttling," Proceedings of 9th International Symposium on High Performance Computer Architecture (HPCA), 2003.
Ashok et al., "Cool-Mem: Combining Statically Speculative Memory Accessing with Selective Address Translation for Energy Efficiency", in Proceedings of the 10th international conference on Architectural Support for Programming Languages and Operating Systems (ASPLOS 2002), pp. 133-143, San Jose, CA, Oct 2002.
Ashok et al., "Coupling Compiler-Enabled and Conventional Memory Accessing for Energy Efficiency", ACM Transactions on Computer Systems (TOCS), vol. 22, No. 2, pp. 180-213, May 2004.
Bahar et al., "Power and Energy Reduction Via Pipeline Balancing", IEEE, 12 pgs., (2001).
Baniasadi et al., "Instruction Flow-Based Front-end Throttling for Power-Aware High-Performance Processors", (ISLPED '01), ACM, pp. 16-21, (2001).
Bechade et al., "A 32b 66MHz 1.8W Microprocessor", Digest of Technical Papers, IEEE, pp. 208-209, (1994).
Bellas et al., Using Dynamic Cache Management Technique to Reduce Energy in Genearl Purpose Processors, 2000, pp. 693-708.
Ben Naser et al., "A Step-by-Step Design and Analysis of Low Power Caches for Embedded Processors", Boston Area Architecture Workshop (BARC-2005), Jan 2005.
Ben Naser, M., "Data Memory Subsystem Resilient to Process Variations", PHD Thesis, Jan. 2008.
Ben Naser, M., "Designing Memory Subsystems Resilient to Process Variations", IEEE Computer Society Annual Symposium on VLSI (ISVLSI 2007), Brzail, May 2007.
Ben Naser, M., "Power and Failure Analysis of Cam Cells Due to Process Variations", Proc. of 13th IEEE International Conference on Electronics, Circuits and Systems (ICECS'06), Nice, France, Dec. 2006.
Benini, et al., "A Recursive Algorithm for Low-Power Memory Partitioning", (ISLPED'00), ACM pp. 78-83 (2000).
Brooks et al., "Wattch: A Framework for Architectural-Level Power Analysis and Optimizations", Proceedings of the 27th International Symposium on Computer Architecture (ISCA '00); ACM, pp. 83-94, (2000).
Burger et al., "The SimpleScalar Tool Set, Version 2.0", Computer Sciences Dept., Univ. of Wisconsin-Madison, Technical Report 1342, pp. 13-25 (1997).
Burtscher et al., "Static Load Classification for Improving the value Predictability of Data-Cache Misses", ACM (2000), pp. 222-233.
Bursky, D., "Advanced DRAM architectures overcome data bandwidth limits", Electron. Des., vol. 45, pp. 73-88 (1997).
Buyuktosunoglu et al., "An Adaptive Issue Queue for Reduced Power at High Performance" Power-Aware Computer Systems, First International Workshop, PACS 2000, pp. 25-39 (2000).
Calder et al. "Next Cache Line and Set Prediction." Proceedings of the 1995 International Computer Symposium on Computer Architecture, ACM, pp. 287-296 (1995).
Calder et al., "Fast & Accurate Instruction Fetch and Branch Prediction", IEEE, pp. 2-11 (1994).
Cantin et al., "Cache Performance for Selected SPEC CPU2000 Benchmarks" Computer Architecture News, 29(4):13-18 (2001).
Chheda et al., "Combining compiler and runtime IPC predictions to reduce energy in next generation architectures", Proceedings of the First Conference on Computing Frontiers, pp. 240-254, Italy, Apr 2004.
Chheda et al., "Memory Systems: Overview and Trends", Encyclopedia of Life Support Systems, 2001.
Chiou et al., "Application-Specific Memory Management for Embedded Systems Using Software-Controlled Caches", (DAC'00), ACM, pp. 416-419 (2000).
Collins, L. "Power drops focus the minds at ARM", EE Times (2002), [online] Retrieved from the Internet:<URL: http://eetimes.eu/uk/16505609> [retrieved on Aug. 8, 2008].
Compaq Computer Corporation, "Compiler Writer's Guide for the Alpha 21264", Digital Equipment Corporation © 1999.
Cooper et al., "Compiler-Controlled Memory", ASPLOS VIII; ACM, 33(11):2-11 (1998).
Cosoroba, A., "Double Data Rate SYNCHRONOUS DRAMS in High Performance Applications", WESCON'97 IEEE Conference Proceedings, (1997) pgs. 387-391.
Cowell et al., "Improved Modeling and Data-Migration for Dynamic Non-Uniform Cache Access", in WDD2 2003 organized in conjunction with ISCA 2003.
Deitrich et al., "Sepculative Hedge: Regulating Compile-Time Speculation Against Profile Variations", IEEE (1996), pp. 70-79.
Delaluz et al., "Energy-Oriented Compiler Optimizations for Partitioned Memory Architectures", International Conference on Compilers, Architecture and Synthesis for Embedded Systems, Proceedings of the 2000 international conference on Compilers, architecture, and synthesis for embedded systems, San Jose, CA, 10 pp., (2000).
Folegnani et al., "Energy-Effective Issue Logic", IEEE, 10 pgs. (2001).
Frank et al., "SUDS: Primitive Mechanisms for Memory Dependence Speculation", Technical Report. LCS-TM-591, Oct. 1998.
Furber et al., "ARM3 -32b RISC Processor with 4 KByte On-Chip Cache", VLSI'89, Elsevier, pp. 35-44 (1989).
Furber et al., "Power Saving Features in AMULET2e", In Power Driven Microarchitecture Workshop at 25th Annual International Symposium on Computer Architecture, Barcelona, Spain, 4 pgs. (Jun. 1998).
Ghiasi et al., "Using IPC Variation in Workloads with Externally Specified Rates to Reduce Power Consumption", in Workshop on Complexity Effective Design, Vancouver, Canada, pp. 1-10 (Jun. 2000).
Gowan et al., "Power Considerations in the Design of the Alpha 21264 Microprocessor", (DAC 98), ACM, pp. 726-731 (1998).
Grant et al., "Annotation-Directed Run-Time Specialization in C", ACM (1997), pp. 163-178.
Guo et al., "Compiler-Enabled Cache Management for Pointer-Intensive Programs", Boston Area Architecture Workshop (BARC-2003), Jan. 2003.
Guo et al., "Energy Characterization of Hardware-Based Data Prefetching", Proc. of the IEEE Intl. Conference on Computer Design (ICCD'04), pp. 518-523, Oct. 2004.
Guo et al., "Energy-Aware Data Prefetching for General-Purpose Programs", Proc. of PACS'04 Workshop on Power-Aware Computer Systems, Micro-37, Dec. 2004; to be appeared on Lecture Notes in Computer Science.
Guo et al., "PARE: A Power-Aware Data Prefetching Engine", Proc. of International Symposium on Low Power Electronics and Design (ISLPED'05), San Diego, CA, Aug 2005.
Guo et al., "Runtime Biased Pointer Analysis and Its Application on Energy Efficiency", Proc. of Workshop on Power-Aware Computer Systems (PACS'03), Micro-36, Dec. 2003, San Diego, CA; also in Lecture Notes in Computer Science, vol. 3164, pp. 1-12, Springer 2004, ISBN 3-540-24031-4.
Guo et al., "Synchronization Coherence: A Transparent Hardware Mechanism for Cache Coherence and Fine-Grained Synchronization", accepted by Journal of Parallel and Distributed Computing (JPDC), 2007.
Guo, Y., "Compiler-Assisted Hardware-Based Data Prefetching for Next Generation Processors", PHD Thesis, May 2007.
Harvard University / Michael D. Smith's Research Group on Compilation and Architecture; [online] Retrieved from the Internet<URL:http://www.eecs.harvard.edu/hube/software/software.html> [retrieved on May 4, 2004].
Heinrich, J., MIPS R10000 Microprocessor's User Manual, 2nd Ed., MIPS Technologies, Inc. (1996).
Heinrich, J., MIPS R4000 Microprocessor User's Manual, 2nd Ed., MIPS Technologies, Inc. (1994).
Henry et al., "Circuits for Wide-Window SuperScalar Processors" (ISCA'00), ACM, pp. 236-247 (2000).
Hinton et al., "The Microarchitecture of the Pentium 4 Processor", Intel Technology Journal Q1, pp. 1-12 (2001).
Huang et al., "Speculative Disambiguation: A Compilation Technique for Dynamic Memory Disambiguation", IEEE (1994), pp. 200-210.

(56) References Cited

OTHER PUBLICATIONS

Huang et al., "L1 Data Cache Decomposition for Energy Efficiency", (ISLPED'01), ACM, pp. 10-15 (2001).
Inoue et al., "Way-Predicting Set-Associative Cache for High Performance and Low Energy Consumption", (ISLPED'99), ACM, pp. 273-275 (1999).
Intel, "Intel StrongARM* SA-1110 Microprocessor", SA-1110 Brief Datasheet, pp. 1-9 (2000).
Itoh et al., "DPA Countermeasure Based on 'Masking Method", ICICS 2001, LNCS 2288, pp. 440-456 (2002).
Jain et al., "A 1.2Ghz Alpha Microprocessor with 44.8GB/s Chip Pin Bandwidth", IEEE, pp. 240-241 (2001).
Kaxiras et al., "Cache Decay: Exploiting Generational Behavior to Reduce CacheLeakage Power", IEEE, pp. 240-251 (2001).
Kever et al., "A 200MHz RISC Microprocessor with 128kB On-Chip Caches", IEEE, pp. 410, 411 and 495 (1997).
Kin et al., "The Filter Cache: An Energy Efficient Memory Structure", IEEE, pp. 184-193 (1997).
Kowalczyk et al., "First-Generation MAJC Dual Processor", IEEE, pp. 236-237 and 451 (2001).
Kulkarni et al., "Advanced Data Layout Optimization for Multimedia Applications", Lecture Notes in Computer Science; vol. 1800, Proceedings of the 15 IPDPS 2000 Workshops on Parallel and Distributed Processing, 8 pps. (2000).
Lam et al., "Limits of Control Flow on Parallelism", ACM, pp. 46-57 (1992).
Larsen et al., "Exploiting Superword Level Parallelism With Multimedia Instruction Sets", (PLDI'00), ACM, pp. 145-156 (2000).
Lee et al., "MediaBench: A Tool for Evaluating and Synthesizing Multimedia and Communications Systems", International Symposium on Microarchitecture, pp. 330-335 (1997).
Lee et al., "Region-Based Caching: An Energy-Delay Efficient Memory Architecture for Embedded Processors." (CASES '00) ACM, pp. 120-127 (2000).
Leenstra et al., "A 1.8 GHz Instruction Buffer", IEEE, pp. 314-315 and 459 (2001).
Manne et al., "Pipeline Gating: Speculation Control for Energy 141 (1998). Reduction", IEEE, pp. 132-141 (1998).
Marculescu, D., "Profile-Driven Code Execution for Low Power Dissipation", (ISPLED'00) ACM, pp. 253-255 (2000).
Maro et al., "Dynamically Reconfiguring Processor Resources to Reduce Power Consumption in High-Performance Processors, Workshop on Power-Aware Computer Systems", (PACS '00 / LNCS 2008) ACM, pp. 97-111 (2001).
Memik et al., "A Selective Hardware/Compiler Approach for Improving Cache Locality", Center for Parallel and Distributed Computing, Northwestern University; pp. 1-21 (2000).
Michaud et al. "Data-Flow Prescheduling for Large Instructions Windows in Out-of-Order Processors, 7th International", IEEE, pp. 27-36 (2001).
Milutinovic et al., "The Split Temporal/Spatial Cache: Initial Performance Analysis", Proceedings of the SCIzzL-5, 8 pps. (1996).
Montanaro et al., "A 160 MHz, 32b, 0.5-W CMOS RISC Microprocessor", IEEE, 31(11):1703-1714 (1996).
Moritz et al., "Adaptive Distributed Software Virtual Memory for Raw", Laboratory for Computer Science, Raw group, MIT, Jan 1999, Cambridge.
Moritz et al., "Exploring Cost-Performance Optimal Designs of Raw Microprocessors", The 6th Annual IEEE Symposium on Field-Programmable Custom Computing Machines FCCM'98., Apr. 1998, Napa, California.
Moritz et al., "Fault-Tolerant Nanoscale Processors on Semiconductor Nanowire Grids", IEEE Transactions on Circuits and Systems I, special issue on Nanoelectronic Circuits and Nanoarchitectures, vol. 54, iss. 11, pp. 2422-2437, Nov. 2007.
Moritz et al., "FlexCache: A Framework for Flexible Compiler Generated Data Caching", Proc. of the 2nd Intelligent Memory Workshop, IRAM00, Cambridge, MA, Nov 2000.
Moritz et al., "Hot Pages: Design and Implementation of Software Caching for Raw", IBM Research Lab Austin, May 1999.
Moritz et al., "Latching on the Wire and Pipelining in Nanoscale Designs", 3rd Workshop on Non-Silicon Computation (NSC-3), ISCA'04, Germany, Jun 2004.
Moritz et al., "LoGPC: Modeling Network Contention in Message-Passing Programs", ACM Joint International Conference on Measurement and Modeling of Computer Systems, ACM SIGMETRICS/PERFORMANCE 98 Wisconsin Madison, Jun. 1998, also in ACM Performance Evaluation Review Special Issue vol. 26 no. 1.
Moritz et al., "LOGPC: Modeling Network Contention in Message-Passing Programs", IEEE Transactions on Parallel and Distributed Systems, vol. 12, No. 4, pp. 404-415, Apr. 2001.
Moritz et al., "Security Tradeoffs in NEST", DARPA Presentation, Dec 2003.
Moritz et al., "SimpleFit: a Framework for Analyzing Design Tradeoffs in Raw Architectures", IEEE Transactions on Parallel and Distributed Systems, vol. 12, No. 7, pp. 730-742, Jul. 2001.
Moritz et al., "Towards Defect-tolerant Nanoscale Architectures", Invited Paper, IEEE Nano2006, 2006.
Moritz et al., "Hot Pages: Software Caching for Raw Microprocessors", International Symposium for Computer Architecture (ISCA-27), Massachusetts Institute of Technology, Cambridge, MA, pp. 1-12 (1999).
Narayanan et al., "CMOS Control Enabled Single-Type FET NASIC", Best Paper Award, IEEE Computer Society Annual Symposium on VLSI 2008 , 2008.
Narayanan et al., "Comparison of Analog and Digital Nano-Systems: Issues for the Nano-Architect", IEEE International Nanoelectronics Conference (INEC) , 2008.
Narayanan et al., "Image Processing Architecture for Semiconductor Nanowire based Fabrics", accepted by IEEE 8th International Conference on Nanotechnology, 2008.
Nicolau et al., "Measuring the Parallelism Available for Very Long Instruction Word Architectures", IEEE Transactions on Computers, 33(11):968-976 (1984).
Palacharla et al., "Complexity-Effective Superscalar Processors", (ISCA'97) ACM, pp. 206-218 (1997).
Panda et al., "Efficient Utilization of Scratch-Pad Memory in Embedded Processor Applications", IEEE, pp. 7-11 (1997).
Parikh et al., "Power Issues Related to Branch Prediction", (HPCA'02) IEEE, 12 pgs. (2002).
Pering et al., "Dynamic Voltage Scaling and the Design of a Low-Power Microprocessor System", In Power Driven Microarchitecture Workshop, attached to ISCA98, (Jun. 1998).
Ponomarev et al., "Reducing Power Requirements of Instruction Scheduling Through Dynamic Allocation of Multiple Datapath Resources", IEEE, pp. 90-101 (2001).
Postiff et al., "The Limits of Instruction Level Parallelism in SPEC95 Applications", Computer Architecture News, vol. 217(1). 10 pgs. (1999).
Powell et al., "Reducing Set-Associative Cache Energy via Way-Prediction and Selective Direct-Mapping", IEEE, pp. 54-65 (2001).
Prasad et al., "Efficient Search Techniques in the Billion Transistor Era", Invited paper, appears in PDPTA, Las Vegas, NV, 2001.
Qi et al., "A Unified Cache Coherence and Synchronization Protocol", Boston Area Architecture Workshop (BARC-2004), Jan 2004.
Ramirez et al., "Branch Prediction Using Profile Data", Springer-Verlag Berlin Heidelberg (2001), pp. 386-394.
Ranganathan et al., "Reconfigurable Caches and their Application to Media Processing", (ISCA'00) ACM, pp. 214-224 (2000).
Reinman et al., "An Integrated Cache Timing and Power Model", COMPAQ Western Research Lab, pp. 1-20 (1999).
Rugina et al., "Pointer Analysis for Multithreaded Programs", Proc. of SIGPLAN'99 Conf. on Program Language Design and Implementations (May 1999).
Sair et al., "Memory Behavior of the SPEC2000 Benchmark Suite", IBM Thomas J. Watson Research Center Technical Report RC-21852, pp. 1-8, (Oct. 2000).
Sanchez et al., Static Locality Analysis for Cache Management, pp. 261-271. (1997).
Schlansker et al., "Achieving High Levels of Instruction-Level Parallelism with Reduced Hardware Complexity", Hewlett Packard Laboratories (HP-96-120), pp. 1-85 (1994).

(56) References Cited

OTHER PUBLICATIONS

Simunie et al., "Source Code Optimization and Profiling of Energy Consumption in Embedded Systems", Proc. 13th Int'l Symposium on System Synthesis (2000), pp. 193-198.
Singh et al., "Short Range Wireless Connectivity for Next Generation Architectures", Invited paper, appears in PDPTA, Las Vegas, NV, 2001.
Sohi et al., "Instruction Issue Logic for High-Performance, Interruptable Pipelined Processors", ACM, pp. 27-34 (1987).
Stanford University SUIF Compiler Group [online] Retrieved from the Internet<URL: http://suif.stanford.edu/> [retrieved on May 4, 2004].
Steensgard, B., "Points-to Analysis in Almost Linear Time", POPL96 (1996).
The Standard Performance Evaluation Corporation, http://www.spec.org, (©2002).
Tune et al., "Dynamic Predictions of Critical Path Instructions", IEEE, pp. 185-195 (2001).
Unsal et al., "Cool-Cache for Hot Multimedia", in Proc. of the 34th Annual International Symposium on Microarchitecture (MICrO-34), Austin, TX, pp. 274-283, Dec. 2001.
Unsal et al., "Cool-Cache: A compiler-enabled energy efficient data caching framework for embedded/multimedia processors", ACM Transactions on Embedded Computing Systems (TECS), vol. 2(3):373-392, Aug 2003.
Unsal et al., "Cool-Fetch: A Compiler-Enabled Ipc Estimation Based Framework for Energy Reduction", Proc. of the 8th Annual Workshop on Interaction between Compilers and Computer Architecture (INTERACT-8), pp. 43-52, Feb 2004.
Unsal et al., "On Memory Behavior of Scalars in Embedded Multimedia Systems", Workshop on Memory Performance Issues, ISCA, Goteborg, Sweden, Jun. 2001.
Unsal et al., "An Analysis of Scalar Memory Accesses in Embedded and Multimedia Systems," High Performance Memory Systems, Springer-Verlag, 2003.
Unsal et al., "Cool-Fetch: Compiler-Enabled Power-Aware Fetch Throttling," IEEE Computer Architecture Letters, vol. 1, 2002.
Unsal et al., "The Minimax Cache: An Energy Efficient Framework for Media Processors," IEEE, pp. 131-140 (2002).
Unsal et al., High-Level Power-Reduction Heuristics for Embedded Real-Time Systems, University of Massachusetts, pp. 1-6, (2000).
Unsal et al., Power-Aware Replication of Data Structures in Distributed Embedded Real-Time Systems, IPDPS 2000 Workshops, pp. 839-846.
Voronin, A. "Data Storage on Hard Disks" [online] Retrieved from the Internet:>URL:http://www.digit-life.com/articles/bootman/index.html> [retrieved on Aug. 27, 2008].
Wall, David W., "Limits of Instruction-Level Parallelism", ACM, pp. 176-188 (1991).
Wang et al., "Combining 2-level Logic Families in Grid-based Nanoscale Fabrics", accepted by IEEE/ACM Symposium on Nanoscale Architectures(NanoArch'07), Oct. 2007.
Wang et al., "Combining Circuit Level and System Level Techniques for DefectTolerant Nanoscale Architectures", 2nd IEEE International Workshop on Defect and Fault Tolerant Nanoscale Architectures (NanoArch 2006), Boston, MA, Jun. 2006.
Wang et al., "Compiler-Based Adaptive Fetch Throttling for Energy Efficiency", Proc. of the 2006 IEEE International Symposium on Performance Analysis of Systems and Software(ISPASS'06), Austin, TX, Mar 2006.
Wang et al., "NASICs: A Nanoscale Fabric for Nanoscale Microprocessors", IEEE International Nanoelectronics Conference (INEC), 2008.
Wang et al., "Opportunities and Challenges in Application-Tuned Circuits and Architectures Based on Nanodevices", Proceedings of the First Conference on Computing Frontiers, pp. 503-511, Italy, Apr. 2004.
Wang et al., "Self-Healing Wire-Streaming Processors on 2-D Semiconductor Nanowire Fabrics", NSTI (Nano Science and Technology Institute) Nanotech 2006, Boston, MA, May 2006.
Wang et al., "Wire-Streaming Processors on 2-D Nanowire Fabrics", NSTI (Nano Science and Technology Institute) Nanotech 2005, California, May 2005.
Wang, T., "Exploring Nanoscale Application-Specific ICs and Architectures", Boston Area Architecture Workshop (BARC-2004), Jan 2004.
Weber "Hammer: The Architecture AMD's of Next-Generation Processors", Microprocessor Forum, (2001).
Wilson et al., "Efficient Context-Sensitive Pointer Analysis for C Programs", Proc. ACM SIGPLAN'95 Conf. on Pgrogramming Language Design and Implementation, (Jun. 1995).
Wilton et al., "CACTI: An Enhanced Cache Access and Cycle Time Model", IEEE -Journal of Solid-State Circuits, 31(5):677-688 (1996).
Witchel, E., "Direct Addressed Caches for Reduced Power Consumption", IEEE, pp. 124-133 (2001).
Yang et al., "An Integrated Circuit/Architecture Approach to Reducing Leakage in Deep-Submicron High-Performance I-Caches", IEEE, pp. 147-157 (2001).
Young et al., "Improving the Accuracy of Static Branch Prediction Using Branch Correlation", ACM (1994), pp. 232-241.
Zhang et al., "Compiler Support for Reducing Leakage Energy Consumption", Proc. of the Design, Automation and Test in Europ Conference and Exhibition [DATE'03] (Mar. 2003).
Zhang et al., "Highly-Associative Caches for Low-Power Processors", Kool Chips Workshop, 33rd International Symposium on Microarchitecture, 6 pp. (2000).
227 Zyuban et al., "Inherently Lower-Power High-Super-Performance Superscalar Architectures", IEEE Transactions on Computers, 50(3):268-285 (2001).
International Preliminary Examination Report in application PCT/US2003/21076, Mailed Sep. 10, 2004.
International Search Report in Application No. PCT/US03/20999, dated Oct. 10, 2003.
International Search Report for Application PCT/US03/21120, dated Jul. 30, 2004.
Aho et al., Compilers: Principles, Techniques and Tools, Addison-Wesley, Reading, MA 1988.
Micro'34 2001, 34th Annual Acm/IEEE International Symposium on Microarchitecture (2001).
Cohn et al., "Optimizing Alpha Executables on Windows NT with Spike", Digital Tech. Jour., vol. 9(1), pp. 2-20 (1997).
Bellas et al., "Architectural and Compiler Techniques for Energy Reduction in High-Performance Microprocessors", IEEE Trans. On Very Large Scale Integration Systems, vol. 8(3), pp. 317-326 (2000).
Unnikrishnan et al., "Dynamic Compilation for Energy Adaption", IEEE/ACM Int'l Conf. on Computer Aided Design (2002).
Kim et al., "Predictive Precharging for Bitline Leakage Energy Reduction", 15th Ann. IEEE Inn ASIC/SOC Conf., pp. 36-40 (2002).
Action and Response History from PAIR in U.S. Appl. No. 10/191,646, through Oct. 2, 2008.
Action and Response History from PAIR in U.S. Appl. No. 10/191,946, through Aug. 28, 2008.
Action and Response History from PAIR in U.S. Appl. No. 10/967,989, through Dec. 23, 2008.
Action and Response History from PAIR in U.S. Appl. No. 10/191,774, through Aug. 28, 2008.
Action and Response History from PAIR in U.S. Appl. No. 10/191,775, through Aug. 28, 2008.
Abstract search, "SIMD Processor" dated Mar. 21, 2003 (484 pages—in two parts).
Babb et al., "Parallelizing Applications into Silicon", The 7th Annual IEEE Symposium on Field-Programmable Custom Computing Machines, FCCM'99, Napa, CA (Apr. 1999).
Banerjee et al., "Fast execution of loops with IF statements", IEEE vol. 84, pp. 126-132 (1984).
Biham et al., "Differential Cryptanalysis of DES-like Cryptosystems", J. Cryptology, vol. 4, pp. 3-72 (1991).
Chang et al., "Protecting Software Code by Guards", Proc. ACM Workshop on Security and vacy gital Rights management (SPDRM), LNCS 2320, pp. 160-175 (2002).

(56) References Cited

OTHER PUBLICATIONS

Chase et al., "Lightweight Shares Objects in a 64-Bit Operating System", Univ. of Washington, Dept. of Computer Science & Engineering, Technical Report Mar. 9, 1992, Seattle, WA (Jun. 1992).
Cortadella et al., "Evaluation of A +B = K Conditions Without Carry Propagation", IEEE Trans. on Computers, vol. 41(11), pgs. 1484-1488 (Nov. 1992).
Daemen et al., "The Rijndael Block Cipher—AES Proposal", [online] Tech. Rep., Mar. 9, 1999 [retrieved on Apr. 1, 2008], Retrieved from the Internet: <URL:http://csrc.nist.gov/encryption/aes/round2/r2algs.htm>.
Gandolfi et al., "Electromagnetic Analysis: Concrete Results", Workshop of Cryptographic Hardware and Embedded Systems (CHES'01), LNCS 2162, pp. 251-261 (2001).
Gilmont et al., "Hardware Security for Software Privacy Support", Electronics Lett., vol. 35(24), pp. 2096-2097 (1999).
Gutmann, P., "Data Remanence in Semiconductor Devices", Proc. of the 10th Usenix Security Symposium, 17 pp. (2001).
Gutmann, P., "Secure Deletion of Data from Magnetic and Solid-State Memory", Proc. of the 6th USENIX Security Symposium, 18 pp. (1996).
Hennessey et al., "Enhancing Vector Performance", Computer Architecture, a Qualitative Approach, Second Edition, Section 5, pp. B23-B29 (1996).
IBM, "Single-Bit Processor Enable Scheme", IBM Technical Disclosure Bulletin, vol. 29, No. 11, pp. 5016-5017 (Apr. 1987).
Intel 80386 Programmer's Reference Manual (1986).
Kelsey et al., "Side Channel Cryptanalysis of Product Ciphers", Proc. ESORICS'98, pp. 97-110 (1998).
Kocher et al., "Differential Power Analysis", CRYPTO'99, LNCS 1666, 10 pgs. (1999).
Kocher et al., "Timing Attacks on Implementations of Diffie-Hellmann, RSA, DSS and Other Systems", Adv. In Cryptology (CRYPTO'96), 10 pgs. (1996).
Kommerling et al., "Design Principles for Tamper-Resistant Smartcard Processors", USENIX Workshop on Smartcard Technology, 12 pgs. (1999).
Kuhn et al., "Tamper Resistance—A Cautionary Note", Proc. of the 2nd USENIX Workshop on Electronics Commerce, 11 pgs. (1996).
Levinthal et al., "Chap—A SIMD Graphics Processor", Computer Graphics, vol. 18(3), (Jul. 1984).
Lie et al., "Architectural Support for Copy and Tamper Resistant Software", Proc. of the 6th Int'l Conf. Architectural Support for Programming Languages and Operating Systems, ACM, 10 pgs. (2000).
Loughry et al., "Information Leakage from optical Emanations", ACM Trans. On Information and System Security, vol. 5(3), 28 pgs. (2002).
MAC OS Runtime Architectures for System 7 Through MAC OS 9, Ch. 7, (Pub. Jan. 31, 1997 (c) Apple Inc.) [online] Retrieved from the Internet: <URL:http://developer.apple.com/documentation/mac/pdf/MacOS_RT_Architectures.pdf> [retrieved on Aug. 13, 2009].
Menezes et al., "Handbook of Applied Cryptography", CRC Press (CRC Press Series on Discrete Mathematics and Its Applications), (1997).
Messerges et al., "Examining Smart Card Security Under the Threat of Power Analysis Attacks", IEEE Trans. On Computers, vol. 51(5), pp. 541-552 (2002).
PowerPC Upgrade FAQ, Powerbook 500 Series PPC Upgrade from IMAX (dated Jan. 28, 1997) [online], Retrieved from the Internet: <URL:http://www.darryl.com/ppcfaq.html> [retrieved on Aug. 13, 2009].
Quisquater et al., "Electromagnetic Analysis (EMA) Measures and Counter-Measures for Smart Cards", E-smart 2001, LNCS 2140, pp. 200-210 (2001).
Schwartz et al., "Disassembly of Executable Code Revisited", Proc. 9th Working Conf. on Reverse Engineering (WCRE'02), 10 pgs. (2002).
Skorobogatov et al., "Optical Fault Induction Attacks", Proc. of Cryptographic Hardware and Embedded Systems (CHES'02), LNCS 2523, pp. 2-12 (2003).
Srivastava et al., "Atom: A System for Building Customized Program Analysis Tools", Proc. of ACM SIGPLAN'94 Conf. on Programming Languages Design and Implementation, pp. 196-205 (1994).
Tygar et al., "Dyad: A System for Using Physically Secure Coprocessors", Tech. Rep. CMU-CS-91-140R, Carnegie Mellon University, 38 pgs. (1991).
Vinciguerra et al., "An Experimentation Frameowrk for Evaluating Disassembly and Decompilation Tools for C++ and Java", IEEE Proc. of the 10th Working Conf. on Reverse Engineering (WCRE'03), 10 pgs. (2003).
Weingart et al., "Physical Security Devices for Computer Subsystems: A Survey of Attacks and Defenses", Workshop on Cryptographic Hardware and Embedded Systems (CHES2000), LNCS 1965, pp. 302-317 (2000).
Wikipedia entry for "context switch", (Pub. Oct. 26, 2001) [online] Retrieved from the Internet: <URL:http://en.wikipedia.org/w/index.php?title=Context_switch&oldid=244184> [retrieved on Aug. 13, 2009].
Wollinger et al., "How Secure are FPGAs in Cryptographic Applications", Proc. of the 13th Int'l Conf. on Field-Programmable Logic and Applications (FPL-2003), 11 pgs. (2003).
Action and Response History from PAIR in U.S. Appl. No. 10/191,646, through Aug. 12, 2009.
Action and Response History from PAIR in U.S. Appl. No. 10/987,374, through Aug. 14, 2009.
Action and Response History from PAIR in U.S. Appl. No. 10/967,989, through Aug. 14, 2009.
Steinke et al., "Reducing Energy Consumption by Dynamic Copying of Instructions onto Onchip Memory", Proc. of the 15th Int'l Symposium on System Synthesis, pp. 213-218 (2002).
Action and Response History from PAIR in U.S. Appl. No. 10/987,374, through Nov. 9, 2009.
Action and Response History from PAIR in U.S. Appl. No. 10/967,989, through Nov. 9, 2009.
Action and Response History from PAIR in U.S. Appl. No. 10/987,374, through Feb. 25, 2010.
Ashok et al., "Cool-Mem: Combining Statically Speculative Memory Accessing with Selective Address Translation for Energy Efficiency", in Proceedings of the 10th international conference on Architectural Support for Programming Languages and Operating Systems (ASPLOS 2002), pp. 133-143, San Jose, CA, Oct. 2002.
Action and Response History from PAIR in U.S. Appl. No. 11/804,947, through Apr. 1, 2010.
Action and Response History from PAIR in U.S. Appl. No. 10/967,989, through May 5, 2010.
Athanas et al., "Processor Reconfiguration Through Instruction-Set Metamorphosis", IEEE / Computer Magazine, v. 26(3), pp. 11-18 (1993).
Mirsky et al., "MATRIX: A Reconfigurable Computing Architecture with Configurable Instruction Distribution and Deployable Resources", Proc. of the IEEE Symposium on FPGSs for Custom Computing Machines, pp. 157-166 (1996).
Schneier et al., "Applied Cryptography, 2nd Ed.", pp. 13 and 270-278, John Wiley & Sons, Inc., (pub.), (1996).
Action and Response History from PAIR in U.S. Appl. No. 10/987,374, through Jun. 7, 2010.
Kim et al., "Partitioned Instruction Cache Architecture for Energy Efficiency", ACM Trans. On Embedded Computing Systems, v.2(2), pp. 163-185 (May 2003).
Mueller et al., "Predicting Instruction Cache Behavior", ACM SIGPLAN Workshop on Language, Compiler * Tool Support for Real-Time Systems (Jun. 1004).
Action and Response History from PAIR in U.S. Appl. No. 10/967,989, through Jul. 27, 2010.
White, R., "How Computers Work", Millenium Edition, Que Corporation, p. 36 (1999).
Action and Response History from PAIR in U.S. Appl. No. 12/347,252, through Aug. 23, 2010.
Action and Response History from PAIR in U.S. Appl. No. 11/804,947, through Feb. 3, 2011.

(56) References Cited

OTHER PUBLICATIONS

Action and Response History from PAIR in U.S. Appl. No. 10/987,374, through Feb. 3, 2011.
Action and Response History from PAIR in U.S. Appl. No. 11/981,178, through Feb. 3, 2011.
Action and Response History from PAIR in U.S. Appl. No. 10/967,989, through Feb. 3, 2011.
ARM Architecture Reference Manual—ARM DDI 0100E, pp. A4-28 and A4-82 ((c) 1996-2000).
Actel corporation, "Design Security in Nonvolatile Flash and Antifuse FPGAs Security Backgrounder", [online] Retrieved from the Internet: URL<http://www.actel.com/documents/DesignSecurity_WP.pdf> [retrieved on Feb. 22, 2011] (2002).
ANSI x9.17, "American national standard for financial institution key management (wholesale)", Tech. Rep., American Bankers Assoc. (1985).
Antoniou, A., "Digital Filters: Analysis, Design & Applications", McGraw-Hill, New York, NY (1993).
Gassend et al., "Controlled Physical Random Functions", Proc. 18th Ann. Computer Security Applications Conf. [online] Retrieved from the Internet<URL:http://csg.csail.mit.edu/pubs/memos/Memo-457/memo-457.pdf> [retrieved on Feb. 22, 2011] (2002).
Gilmont et al., "An Architecture of security management unit for safe hosting of multiple agents", Proc. of the Int'l Workshop on Intelligent Communicatinos and Multimedia Terminals, [online] Retrieved from the Internet:<URL:http://citeseerx.ist.psu.edu/viewdoc/download?doi=10.1.1.140.6346 &rep=repl&type=pdf> [retrieved on Feb. 22, 2011] (Nov. 1998).
Grand, J., "Attacks on and Countermeasures for USB Hardware Token Devices", Proc. Fifth Nordic Workshop on Secure IT Systems [online] Retrived from the Internet:<URL:http://citeseerx.ist.psu .edu/viewdoc/download;jsessionid= 98145A989F0A335F16702C1EA12F0819?doi=10.1.1.16.540 &rep=rep1&type=pdf> [retrieved on Feb. 22, 2011] (2000).
Kean, T., "Secure Configuration of Field-Programmable Gate Arrays", Proc. of the 11th Int'l Conf. on Field-Programmable Logic and Applications [online] Retrieved from the Internet<URL:http://citeseerx.ist.psu.edu/viewdoc/download?doi=10.1.1.86.2017 &rep=rep1&type =pdf> [retrieved on Feb. 22, 2011] (2001).
Kuhn, M., "Optical Time-Domain Easvesdropping Risks of CRT Displays", Proc. of the 2002 IEEE Symp. On Security and Privacy [online] Retrieved from the Internet:<URL:http://www.cl.cam.ac.uk/~mgk25/ieee02-optical.pdf> [retrieved on Feb. 22, 2011] (May 2002).
Kuhn et al.,Emanations ,"Soft Tempest: Hiden Data Transmission Using Electromagnetic Emanations", Proc. of 2nd Int'l Workshop on Information Hiding [online] Retrieved from the Internet<URL:http://www.cl.cam.ac.uk/~mgk25/ih98-tempest.pdf> [retrieved on Feb. 22, 2011] (1998).
National Bureau of Standards, "Data Encryption Standard", Tech. Rep. NBS FIPS Pub. 46, Nat'l Bur. Standards, US Dept. of Commerce (Jan. 1977).
Ors et al., "Power-Analysis Attack on an ASIC AES Implementation", Proc. of Int'l.Symp. on Information Tech. [online] Retrieved from the Internet:<URL:http://citeseerx.ist.psu.edu/viewdoc/download?doi=10.1.1.88.2697&r ep=repl&type=pdf> [retrieved on Feb. 22, 2011] (ITCC 2004).
Oppenheim, A. et al., "Discrete-Time Signal Processing", Prentice-Hall, Upper Saddle River, NJ (1999).
Rao et al., "EMPowering Side-Channel Attacks", IBM Research Ctr. [online].Retrieved from the Internet<URL:http://eprint.iacr.org/2001/037.pdf> [retrieved on Feb. 22, 2011] (May 2001).
Skorobogatov, S., "Breaking Copy Protection in Microcontrollers", [online]Retrieved from the Internet<URL:http://www.cl.cam.ac.uk/~sps32/mcu_lock.html> [retrieved on Feb. 22, 2011] (2000).
Skorobogatov, S., "Data Remanence in Flash Memory Devices", Proc. of Cryptog. Hardware and Embedded Systems (CHES2005) [online] Retrieved from the Internet<URL:http://s3.amazonaws.com/ppt-download/data-remanence-in-flash-memory-devices 1949.pdf?response-content-disposition=attachment &Signature=p5IXjx2Qcu760LiE02JwBVQHYCo%3D&Expires=1298390877 &AWSAccessKeyld=AKIAJLJT267DEGKZDHEQ> [retrieved on Feb. 22, 2011] (2005).
Skorobogatov, S., "Tamper Resistance and Physical Attacks", Summer School on.Cryptographic Hardware, Side-Channel and Fault Attacks (ECRPT-2006), Jun. 12-15, 2006, Louvain-la-Neuve [online] Retrieved from the Internet<URL:http://www.cl.cam.ac.uk/~sps32/#Publications> [retrieved on Feb. 22, 2011] (2006).
Telikepalli, A., "Is Your FPGA Design Secure?", XCELL Journal, [online] Retrieved.from the Internet<URL:http://cdserv1.wbut.ac.in/81-312-0257-7Xilinx/files/Xcell%20Journal%20Articles/xcell_47/xc_secure47.pdf> [retrieved on Feb. 22, 2011] (2003).
Trichina et al., "Secure AES Hardware Module for Resource Constrained Devices", ESAS 2004, Lec. Notes in CompSci 3313, [online] Retrieved from the Internet:<URL:http://citeseerx.ist.psu.edu/viewdoc/download?doi=10.1.1.95.6712&rep=rep1&type=pdf> [retrieved on Feb. 22, 2011] (2005).
van Eck, W., "Electronic Radiation from Video Display Units: An Eavesdropping risk?", Computers & Security [online] Retrieved from the Internet:<URL:http://jya.com/emr.pdf>, [retrieved on Feb. 22, 2011] (1985).
Wollinger et al., "Security on FPGAs: State of the Art Implementations and Attacks", ACM Transactions on Embedded Computing Systems (TECS) TECS Homepage archive vol. 3 Issue 3, [online] Retrieved from the Internet<URL:http://www.wollinger.org/papers/Wollingeretal_ACMTransEmbedded SysFPGACryptoOverview.pdf> [retrieved on Feb. 22, 2011] (Aug. 2004).
U.S. Appl. No. 60/802,451, filed on May 22, 2006.
U.S. Appl. No. 60/520,838, filed on Nov. 17, 2003.
U.S. Appl. No. 60/856,593, filed on Nov. 3, 2006.
U.S. Appl. No. 60/515,260, filed on Oct. 29, 2003.
Prosecution History for U.S. Appl. No. 11/804,947, through Mar. 8, 2011.
Prosecution History for U.S. Appl. No. 10/987,374, through Mar. 8, 2011.
Prosecution History for U.S. Appl. No. 11/981,178, through Mar. 8, 2011.
Prosecution History for U.S. Appl. No. 10/967,989, through Mar. 8, 2011.

\* cited by examiner

ENERGY-FOCUSED COMPILER-ASSISTED BRANCH PREDICTION

RELATED U.S. APPLICATION DATA

This application claims the benefits of U.S. Provisional Application No. 60/541,875, filed on Feb. 4, 2004, and Confirmation No 3108, entitled: ENERGY-FOCUSED COMPILER-ASSISTED BRANCH PREDICTION, the contents of which are hereby incorporated by reference into this application as if set forth herein in full.

TECHNICAL FIELD

This invention relates generally to reducing energy and power consumption and improving performance in a microprocessor and, more particularly, to reducing energy and power consumption and improving performance by controlling branch prediction and branch prediction related activities in a processor. This is accomplished by the use of a combined hardware and static prediction mechanism assisted by compiler information inserted into the application code, that allows a branch target to be predicted energy efficiently and with the prediction of target addresses often preceding the fetch or decode of a branch.

BACKGROUND

Microprocessors (referred to herein simply as "processors") consume energy/power during their operation. It is advantageous to reduce the amount of energy consumed, particularly in the case of devices that run off limited power supplies.

Various factors affect the amount of energy that a processor consumes. For example, the frequency at which the processor operates, the voltage level that powers the processor, as well as the load capacitances, affect processor energy consumption. Reducing the frequency of the processor or the voltage supply may decrease processor energy consumption, however, doing so may also adversely affect the performance of the processor.

Other techniques to reduce energy consumption, by for example reducing load capacitances, may include changes to processor architectures and processor circuits. Some other techniques rely on modifying the application itself, or any other system layer, to improve energy efficiency.

Branch prediction relates to activities that determine the target address of an instruction that changes the control-flow of a program at runtime such as a branch instruction.

As noted in the literature, branch prediction mechanisms related energy consumed is a significant fraction of a processor's energy consumption. In addition, branch prediction accuracy affects both performance and overall processor energy consumption.

Various factors affect the energy impact of branch prediction. In the following paragraphs, we provide an introduction into various branch prediction mechanisms.

There are different prediction approaches in place today to determine the target of a branch in time, i.e., to avoid the penalty of fetching from the wrong address in the case of a taken branch.

One such approach is static prediction that assumes that a branch behaves uniformly, i.e., it is either taken or not taken, during the entire execution of a program.

Static predictors require typically no hardware-table lookup; they need to find the direction of a branch. This can be easily accommodated in many conditional branch instructions.

For forward-pointing branches such a predictor would typically predict "not taken" as branch outcome, and for backward-pointing it would predict a "taken" target. This seemingly arbitrary rule is based on statistical branch outcomes in programs. For example, it is known that backward-pointing branches are taken 90% of the time and forward-pointing ones are not taken 56% of the time for integer programs such as in the SPEC benchmark suite.

If the prediction is that the branch will be taken, the target address would be calculated at runtime and the next instruction-group fetched from the target address, rather than sequentially. A correctly predicted branch provides, typically, an execution with no performance penalty. Moreover, in architectures such as ARM9 or ARM10 a branch can be folded (e.g., pulled or removed) from the pipeline resulting in what is called zero-cycle branches.

A part of the energy cost of a static prediction is related to pre-decoding instructions in a fetch-buffer, or prefetch buffer, to find out if a fetched instruction is a branch. Pre-decoding is required to determine changes in control-flow before a branch instruction enters the pipeline. In addition, checking the direction of a branch, i.e., to determine if a branch is forward- or backward-pointing, is necessary. The direction of a branch can be often determined by decoding the sign bit of the branch offset. Negative offsets represent backward-pointing branches while positive ones correspond to forward-pointing ones.

If a branch is predicted taken, the target address is typically calculated by performing an arithmetic operation. This is often an addition of the program counter and the constant offset decoded from the branch instruction itself.

Static prediction schemes are often limited to conditional branches where the offset is a constant. Branches that use registers to calculate the address, or indirect branches, cannot typically be predicted before the register content is available in the pipeline. Other complementary schemes such as a return stack would be used for branching related to procedure calls and returns.

While the energy consumed by static prediction is relatively low, such prediction is often not preferred or used, due to its low prediction accuracy. Static predictors rarely exceed 60%-65% prediction accuracy, although in some cases, e.g., for some branch instructions, they can do much better.

During a branch misprediction, there is a high performance and energy penalty. This is due to the extra unnecessary instruction fetches and decodes: a result of fetching from incorrect execution paths. The performance and energy penalty of a misprediction depends on the pipeline depth of the processor and especially the number of stages between the fetch and execute stages and the size of the prefetch buffers, that determine the extra fetches resulting from a mispredicted branch. Even in relatively short pipelines, the branch prediction penalty is significant, e.g., can be as high as 4-5 cycles in modern processors.

A variant of static prediction is based on compile-time static prediction. In such a scheme, a bit in each branch instruction is set by the compiler and determines the direction of a branch. As no hardware lookup is required in either case, the power cost of a runtime static predictor and a compile-time static predictor are similar.

Due to increasing performance requirements of emerging applications, e.g., emerging applications require both wireless and internet capabilities, processor vendors generally prefer dynamic branch predictors.

Dynamic predictors improve the accuracy of branch prediction, and therefore performance, for most applications.

Dynamic predictors are based on runtime mechanisms. Branch history tables or similar auxiliary hardware tables are used to predict the direction of a branch for each branch instruction occurrence. At runtime these tables are continuously updated to better reflect likely branch outcome.

A key difference between static and dynamic prediction is that the same branch instruction can be predicted differently depending on its execution context in the dynamic case. Branch target address caches are often used to store the target address, in addition to the prediction outcome information. This can speed up the process as the target address is readily available after the table lookup.

There are many different dynamic predictors available. For example, depending on whether only local branch-related information is used or if local branch information is combined with global information about the program context in which the branch occurs, at a given time, one can build various dynamic predictors. Many predictors are multi-level requiring lookup of multiple large hardware tables. These tables are implemented similar to caches, with search tags and data array segments. The search is done through an associative lookup mechanism.

Dynamic predictors are typically more accurate than the static predictors, as they capture the dynamic behavior of branches rather than predicting a branch outcome always taken or not taken. Therefore, they are almost always preferred in processor designs that issue multiple instructions per cycle, where the misprediction penalty due to branch misses is fairly large due to the high instruction fetch rates.

Predicting a branch with a dynamic predictor require looking up branch history tables to determine the prediction. The hardware complexity, table size, and associativity of these tables, as well as the lookup frequency, are key determining factors in the ultimate energy efficiency achieved.

A key challenge with branch prediction is, however, not only to determine a likely target address or predict a change of control, i.e., if a branch is taken, but to predict it before the branch is decoded in the pipeline. Otherwise, potentially unnecessary instructions are already fetched on the sequential path adding to the energy consumption and imposing a performance penalty.

A typical solution, often used in today's processors, is to predict branches in parallel with the instruction fetch. In this case, however, branch prediction is performed with almost every instruction fetch, regardless of whether a fetched instruction is a branch or not. This is very energy inefficient as many more table lookups are performed than actual branch instructions would require in a program. For example, assuming that there is one branch instruction per five regular (non-branch) instructions, this would roughly mean five times more branch table lookups and five times more energy consumed.

SUMMARY

The compiler-architecture interaction based processor framework described herein addresses the foregoing need to reduce energy consumption due to branch predictions without impacting performance. In fact, the framework in its preferred embodiment improves branch prediction accuracy and performance and significantly reduces energy costs.

Some of the key factors that determine the energy efficiency of branch prediction mechanisms include: percentage of branches predicted, prediction accuracy, branch prediction related hardware table complexity and number of hardware tables, and frequency of lookups.

The framework, in one of its embodiments, uses static instructions to control branch predictions. Static instructions are control instructions containing compile time information such as hints or other information that might be used at runtime to control execution more efficiently. This is, however, not meant to be limiting. Other embodiments might use solutions that require no added instructions, e.g., static information could be fetched with each program block, such as a basic block, from a dedicated address space and possibly stored separately with dedicated hardware support.

Assuming an embodiment with static instructions, a preferred solution would support many other compiler-enabled energy optimizations encoded within the same instruction. This would amortize the cost of static information related fetch overhead across many energy reduction related techniques.

The framework, in one aspect, is based on making static information about a branch available at runtime some time before the branch is fetched. In one embodiment, every critical basic block that ends with a branch would have such information inserted at the beginning of the block. Whether a given block is critical or not is determined with static analysis and profiling.

In one embodiment, this static information is then decoded and pulled out from the prefetch buffer, not allowing the static control to enter the pipeline. A prefetch buffer is a buffer where many of the instructions are fetched before entering the processor pipeline.

The control information inserted can be used to control a branch at the end of the block by providing information about the branch's position, the mechanism used for prediction, such as static or different dynamic ones, and branch outcome if a branch is predicted statically. This is not intended to be limiting. Additional branch related information could be encoded in a similar manner.

When the static information suggests one of the dynamic predictions, a branch prediction can take place right after the static instruction is pre-decoded in a prefetch buffer. This way, a branch instruction target is often predicted before the branch even enters the fetch stage. This is due to the fact that static instructions are inserted some number of instructions ahead of a branch instruction, or typically at the beginning of a basic block.

As mentioned, static instructions are removed in the prefetch buffer to avoid causing pipeline bubbles. However, even if a static instruction would not be caught in the prefetch buffer, and would enter the pipeline, e.g., that can happen after a pipeline flush in some embodiments, the static instruction would be decoded in the decode stage: this would still allow time for the branch prediction to take place, as the branch would follow several instructions behind and there would still be time to predict the branch before entering the pipeline.

In one aspect, the framework allows branches to be predicted early and the predictions to occur sufficiently early to avoid any penalty due to missed or skipped branches entering the pipeline or predicted too late. Note that a skipped branch, even if predicted in or after the decode stage, would already have caused several unnecessary instruction fetches in case of a taken branch.

Because branch instructions are predicted with static instructions, there is no need to pre-decode or lookup dynamic tables, for each instruction fetch, in basic blocks that use static control for directing prediction. This reduces the frequency of table lookups and their energy costs typically by factor of five or so.

In addition, in a preferred embodiment, not all branch instructions would be predicted dynamically. This could reduce the size of the hardware prediction tables, further reducing the energy requirements of branch predictions.

There are many instructions that can be predicted very well statically and those instructions could instead be predicted by compile time static techniques. Many of the backward-pointing branches for example, would be predicted statically. Backward-pointing branches that are not predictable well statically, would be, however, predicted dynamically.

In addition, in many cases with static and profiling information, even some fraction of the forward-pointing branches could be deemed to have good static predictability, i.e., they would be always taken or not taken. Mapping these branches statically reduces the capacity requirements of hardware prediction tables and saves additional energy without performance impact.

In addition, there are branches that are not predictable, neither statically or dynamically. The framework, in one embodiment, would encode static information to stall the fetch and let these branches execute before additional fetches would occur.

The framework, in one aspect, could be utilized to perform optimizations that are not limited to energy reduction. Examples of optimizations performed may include, but are not limited to, energy, power, and performance. In general, in one aspect, the framework could be used to improve an application's performance or improve the application's energy-delay product or any other metric that is a combination of execution time and power consumption.

If the control bits refer to controlling several instructions during runtime, such as in a basic block, one control instruction inserted before the block can include control information for a variety of optimizations amortizing its added overhead across many optimizations. In one aspect, the performance overhead of control instructions could be avoided with early folding/removal in processor pipelines, accomplished with simple static instruction related pre-decoding logic added to prefetch buffers and instruction fetching buffers. In many predicated architectures, a similar early folding is used, for example, to achieve zero-cycle branches.

The invention can be used to save energy on any type of device that includes a processor. For example, the invention can be used to save energy on personal computers, devices containing embedded controllers, sensor networks, network appliances, and hand-held devices, cellular telephones, and/or emerging applications based on other device technologies.

Unless otherwise defined, all technical and scientific terms used herein have the same meaning as commonly understood by one of ordinary skill in the art to which this invention belongs. Although methods and materials similar or equivalent to those described herein can be used in practice or testing of the present invention, suitable methods and materials are described below. In addition, the materials, methods, and examples are illustrative only and not intended to be limiting.

Other features and advantages of the invention will become apparent from the following description, including the drawings.

DESCRIPTION

In the embodiments described herein, a processor framework uses compile-time information to reduce or enable reduction of energy or power consumption, and/or improve performance in a processor.

Figure 1:
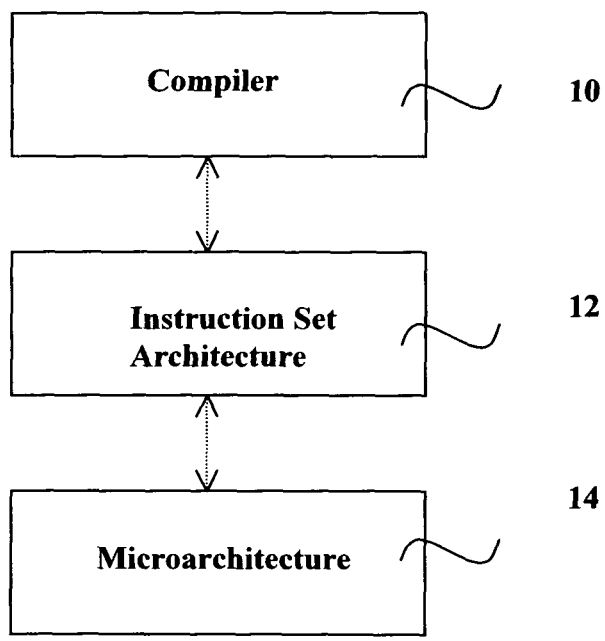
FIG. 1 is a block diagram showing the relationship between a source-level compiler, instruction set architecture, and microarchitecture in a processor.

Referring to FIG. 1, a compiler 10 is a software system that programs circuitry to translate applications from high-level programming languages (e.g., C, C++, Java) into machine specific sequences of instructions. An instruction set architecture (ISA) 12 is a set of rules that defines the encoding of operations into machine specific instructions. The ISA acts as the interface between compiler 10 and the microarchitecture (14). A computer program is a collection of machine level instructions that are executed to perform a desired functionality. Micro-architectural (or architectural) components 14 comprise primarily hardware and/or software techniques that are used during execution of the program. The actual machine can be a microprocessor or any other device that is capable of executing instructions that conform to the encoding defined in the ISA.

Compile-time refers to the time during which the program is translated from a high-level programming language into a machine-specific stream of instructions, and it is not part of execution or runtime. Runtime is the time it takes to execute translated machine instructions on the machine. Compilation is typically performed on a different host machine than execution and it is done on the source program.

In following sections we describe a preferred embodiment of the framework.

Overview of Compiler-Assisted Branch Control with Global Lookahead

The compiler-architecture interaction based processor embodiment described herein address the foregoing need to reduce energy consumption due to branch predictions, without impacting performance. In fact, in its preferred embodiment it improves branch prediction accuracy and performance and significantly reduces energy costs.

Some of the key factors that determine the energy efficiency of branch prediction mechanisms include: percentage of branches predicted, prediction accuracy, branch prediction related hardware table complexity and number of hardware tables, and frequency of lookups.

The framework, in this embodiment, uses static instructions to control branch predictions. This is, however, not meant to be limiting. Other embodiments might use solutions that require no added instructions, e.g., static information could be fetched with each program block, such as a basic block, from a dedicated address space and possibly stored separately with dedicated hardware support. Other embodiments would add information to the control-flow changing instructions.

Figure 2:
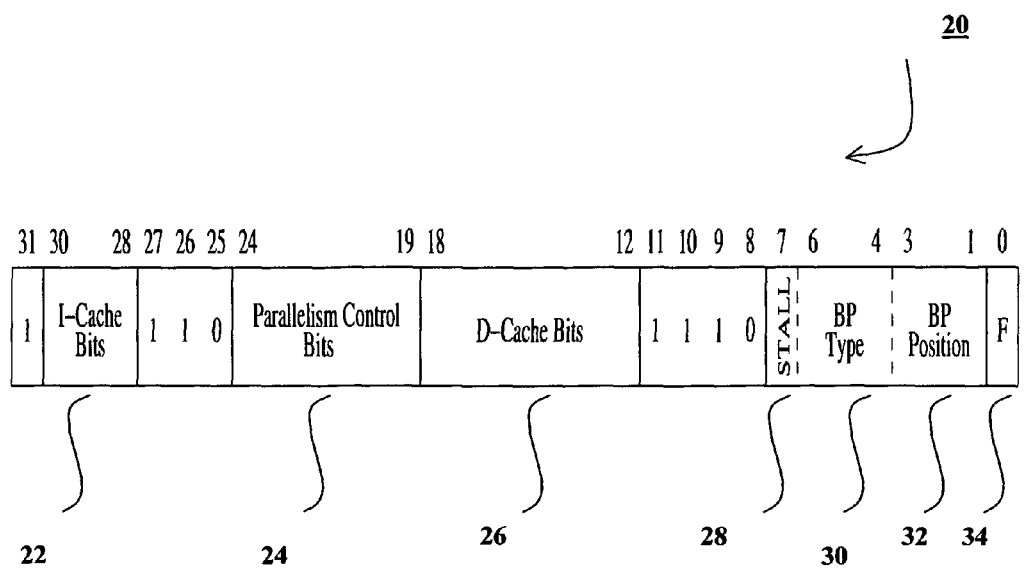
FIG. 2 is a block diagram of a static control instruction inserted in selected program blocks to control branch prediction mechanisms. It also shows other compiler-assisted optimizations that are similarly encoded with the same instructions.

An example of static instruction 20 is shown in FIG. 2.

Assuming an embodiment with static instructions, such as shown in FIG. 2, a preferred solution would support many other compiler-enabled energy optimizations encoded within the same instruction. This would amortize the cost of static information related fetch overhead across many energy reduction related techniques.

The embodiment, in one aspect, is based on making static information about a branch available at runtime some time before the branch is fetched. Critical basic blocks that end with a branch would have such information inserted at the beginning of the block. What is a critical block is determined with static analysis and profiling and as a function of other factors at compile time.

In this embodiment, this static information is then decoded and pulled in the prefetch buffer. A prefetch buffer is a buffer where instructions are fetched before entering the processor pipeline.

The control information inserted can be used to control a branch at the end of the block by providing information about the branch's position, the mechanism used for prediction, such as static or dynamic, branch outcome if a branch is predicted statically, and control to stall the pipeline.

Capturing Branches and Branch Predecoding

The fraction of branches captured is increased as branches are predicted at the time the static control instructions are pre-decoded in the prefetch buffer or decoded later in the pipeline. This allows prediction of more branches that is typically possible with the current state-of-the-art, where branches need to be caught before entering processor pipelines. This often improves performance as more branches are predicted, and fewer unnecessary fetches and decodes are performed as a results of less pipeline flushes.

No branch predecoding is required in the prefetch buffer, in any of the instructions or program blocks that are preceded by related static control information. Such instructions would encode the position of a branch relative to the current program counter. This reduces the energy overhead of branch predecoding that exists in many embedded processors today.

There are often branches with prediction patterns that would require more complex dynamic predictors such as based on global history information. In one embodiment a small such predictor can be added in the microarchitecture to complement several other simpler dynamic predictors, like the binomial predictor. At compile time, one would in that case select the right predictor or prediction mechanism for each control-flow changing instruction. All branches that would not need a sophisticated predictor or that are not critical during execution would simply not be directed to such a sophisticated predictor. Because the size of such global history based predictor in this framework could be kept to very small, for example limiting it to 16 branches rather than 1,000s of branches in current solutions, it would not affect the energy consumption significantly, but it could help improve the prediction accuracy overall that in fact would reduce overall processor energy consumption due to fewer fetched executed instructions.

Reducing the Frequency of Branch Prediction

Because branch instructions are predicted with static instructions, there is no need for looking up dynamic branch history tables in parallel with every instruction fetch, in basic blocks that use static control for directing prediction. This reduces the frequency of table lookups and their energy costs typically by factor of five or so.

Another factor that reduces the branch lookup frequency is because not all branches are directed by the control instruction to be predicted dynamically.

There are many branch instructions that can be predicted very well statically and those instructions are instead being predicted by compile time static techniques. Many of the backward-pointing branches, for example, would be predicted statically. Backward-pointing branches that are not predictable well statically, would be predicted dynamically by setting the branch control-related bits in the static control instruction accordingly. This combined approach achieves a good balance between reducing the energy cost of dynamic prediction without affecting prediction accuracy.

In addition, in many cases, by using static and profiling information, even some fraction of the forward-pointing branches could be deemed to have good static predictability, i.e., if they would be consistently taken or not taken at runtime.

In addition, there are branches that are not predictable, neither statically or dynamically. This embodiment would encode static information to stall the execution and let these branches execute before additional fetches would occur. This would remove the energy penalty due to the frequent misprediction of these branches.

Reducing the Size of Branch Prediction Tables

Mapping a large fraction of branches to be predicted statically reduces the capacity requirements of hardware prediction tables, used for the dynamic prediction cases, and saves additional energy without impacting performance. In this embodiment most of the backward-pointing branches and some of the forward-pointing branches are predicted fully statically. The size of the hardware tables could therefore be reduced to half for the same or better equivalent dynamic prediction accuracy. Difficult critical branches could be directed to small global predictors such as gshare.

This aspect significantly reduces energy consumed whenever a dynamic prediction lookup is performed as the branch lookup tables could be implemented more energy efficiently.

Prediction Accuracy

Prediction accuracy of branch predictions has a significant energy impact. The embodiment described here uses a small binomial predictor of 64 entry and a small gshare predictor of 16 entry, that captures global branch context information, for the dynamic part. Nevertheless, the framework works with any type of dynamic predictor or any number of predictors.

This embodiment often improves prediction accuracy while reducing energy consumption significantly, as compared to the prediction accuracy of a particular dynamic predictor used alone. As described before, this is accomplished by having more branches predicted; branches that are highly predictable statically are predicted statically; branches that require more sophisticated prediction would use such a predictor, branches that are not predictable dynamically or statically are controlled by stalling the fetch until the branch is resolved.

If energy reduction is not the primary concern, and the dynamic prediction tables could be made equal between the compiler-assisted prediction and the dynamic predictor when used alone, then, additional prediction accuracy improvement could result. This is because the dynamic prediction tables would be used for the branches that could be best predicted dynamically and less capacity and conflict misses in branch tables such as branch address caches would be incurred.

Compiler and Profiling Support

Compiler support is used to determine the position of the branches in the control-flow graph of the program relative to the static instruction's position. In addition, compiler support is used to analyze the outcome of branches. For backward-pointing branches static analysis is performed to determine a confidence in the percentage of time the branch is taken. Profiling information can be added to the compiler for any branch that is selected not to be predicted neither statically or with one of the dynamic mechanisms. Forward-pointing branches are selected for static prediction similarly based on profile information. At the code generation phase, a compiler inserts the static instructions and adds the corresponding control decided for branches controlled into the static control instruction.

Encoding

Control information is added per a sequence of instructions, such as a basic block that ends in a branch, such that the code dilution overhead of static control could be amortized across several other compiler-assisted energy optimizations. The sequence where optimization is applied can be determined with static analysis or other means such as profiling. A control instruction is typically inserted before the controlled instruction sequence but other solutions are also possible. Energy increase due to the extra fetches related to static control information can be often minimized with similar compiler-driven instruction memory energy optimizations. Its performance overhead is minimized with removing the control instructions before entering the pipeline. In addition, multiple-issue processors would help hide this overhead further.

Branch prediction control as well as other optimizations not described in this embodiment could be integrated into a processor-wide solution and controlled with one or more control instructions per sequence of instructions. This reduces the control energy overhead as the code-dilution overhead would be amortized across many different energy optimizations, and is the preferred embodiment of the framework.

In one aspect, the control bits could be added as data to an executable. This data can be accessed through a dedicated hardware mechanism that would associate branch targets to addresses where control bits are located in the data memory, for example through a hashing mechanism, to fetch the corresponding control bits.

Independent from how the static bits are added, a static decode unit would decode these bits and generate the control signals for the associated sequence of instructions. During execution, a sequencing mechanism would control both processor resources and select appropriate energy efficient access mechanisms corresponding to the encodings decoded from the compiler-generated control bits.

The control information can also be incorporated as regular extensions to the instruction set or as co-processor instructions.

Referring to FIG. 2, a static instruction is shown that is currently used to control execution in an implementation compatible with the instruction set of a leading embedded microprocessor. A Static Instruction (or BSI) is used to control a group of compiler selected instructions.

This BSI allows static information related to energy focused execution, in a sequence of instructions, to be exposed to the runtime architecture. The BSI instruction provides compiler information for chip-wide energy management, not only branch related. This BSI is used for fine-grained control. Additional instructions, could be used for more coarse-grained optimizations.

The BSI shown in FIG. 2 follows ARM's v5 coprocessor instruction format, specifically the LDC and STC instructions (see ARM Architecture Reference Manual-ARM DDI 0100E, pages: A4-28, A4-82).

Referring to FIG. 2, 30 encodes the type of prediction performed. The three bits encode eight different combinations possible that includes statically predicted backward-pointing branch predicted taken, statically predicted forward pointing predicted taken and not taken, stalling of fetching, various dynamic prediction, etc. The eight possibilities are often enough to encode a variety of scenarios, but it is not intended to be limiting. In other embodiments more or fewer bits could be used and other type of static information encoded.

The position of the branch instruction is encoded in bits 34. This tells the position of the branch relative to the BSI. Different embodiments could encode this information differently. These bits would indicate the occurrence of a branch and, together with the prediction type bits, allow dynamic prediction ahead of fetching the branch instruction. Bits 22,24,26,28 represent encodings of other optimizations that are compiler assisted in other processor domains. This BSI shows a preferred embodiment where the overhead of static control is amortized across different compiler-enabled energy optimizations. Another version of a BSI could encode short branches and allow removal of the branch instruction from the binary. Such an embodiment would remove the dilution overhead of adding static compiler information to a binary entirely as for each such instruction added a branch instruction would be removed.

Other Embodiments

The invention is not limited to the specific embodiments described herein. The invention is not limited to reducing energy consumption or improving performance. It could also be used, in other contexts where control flow prediction is necessary.

Other types of compiler analyses and/or architecture support may be used. The invention may be applied to control any appropriate component of a processor. The optimizations and/or analyses may be performed in a different order and combined with other techniques, in other embodiments.

There are different forms of energy consumption, for example such as dynamic or leakage power related. The invention is not limited to one source of energy consumption. Other embodiments not described herein are also within the scope of the following claims.

What is claimed is:

1. A method for use with a processor, comprising:
adding control information to an instruction sequence at compile time, the control information being added in the instruction sequence prior to a control-flow changing instruction, the control-flow changing instruction for changing a control flow of a computer program at runtime;
removing the control-flow changing instruction from the instruction sequence; and
in hardware, using the control information at runtime (i) to predict an outcome of the control-flow changing instruction, the outcome comprising a target of the control-flow changing instruction that includes a path following the control-flow changing instruction, and (ii) to fetch an instruction corresponding to the path.

2. The method of claim 1, wherein the control information comprises part of an instruction configured to affect at least one of processor efficiency and processor energy consumption.

3. The method of claim 1, wherein the control information comprises part of a payload of a coprocessor instruction.

4. The method of claim 1, wherein the control information is removed from the instruction sequence at runtime before entering a pipeline of the processor;
wherein the outcome of the control-flow changing instruction is predicted prior to the control-flow changing instruction entering the pipeline.

5. The method of claim 1, wherein the control information comprises code for selecting a dynamic branch prediction mechanism at runtime.

6. The method of claim 1, further comprising adding control information to the instruction sequence to stall fetching until a second control-flow changing instruction is executed that is not predictable statically or dynamically.

7. The method of claim 1, wherein the control information comprises static information that suggests one or more of plural dynamic prediction mechanisms.

8. The method of claim 1, further comprising:
performing an analysis of the instruction sequence at compile time in order to generate the control information.

9. The method of claim 1, wherein the control information identifies a position of the control-flow changing instruction in the instruction sequence.

10. The method of claim 1, wherein the outcome of the control-flow changing instruction is coded in the control information.

11. The method of claim 1, wherein the control information specifies a condition under which a control-flow change at an end of the instruction sequence should occur.

12. A system for use with a processor, comprising:
a machine to execute a compiler (i) to add control information to an instruction sequence at compile time, the control information being added in the instruction sequence prior to a control-flow changing instruction, the control-flow changing instruction for changing a control flow of a computer program at runtime, and (ii) to remove the control-flow changing instruction from the instruction sequence; and
microarchitecture to use the control information at runtime to predict an outcome of the control-flow changing instruction, the outcome comprising a target of the control-flow changing instruction that includes a path following the control-flow changing instruction, and (ii) to fetch an instruction corresponding to the path, the microarchitecture comprising hardware.

13. The system of claim 12, wherein the control information comprises part of an instruction configured to affect at least one of processor efficiency and processor energy consumption.

14. The system of claim 12, wherein the control information comprises part of a payload of a coprocessor instruction.

15. The system of claim 12, wherein the microarchitecture is configured to remove the control information from the instruction sequence at runtime before entering a pipeline of the processor; and
wherein the outcome of the control-flow changing instruction is predicted prior to the control-flow changing instruction entering the pipeline.

16. The system of claim 12, wherein the control information comprises code for selecting a dynamic branch prediction mechanism at runtime.

17. The system of claim 12, wherein the compiler is configured to add control information to the instruction sequence to stall fetching until a second control-flow changing instruction is executed that is not predictable statically or dynamically.

18. The system of claim 12, wherein the control information comprises static information that suggests one or more of plural dynamic prediction mechanisms.

19. The system of claim 12, wherein the compiler is configured to perform an analysis of the instruction sequence at compile time in order to generate the control information.

20. The system of claim 12, wherein the control information identifies a position of the control-flow changing instruction in the instruction sequence.

21. The system of claim 12, wherein the outcome of the control-flow changing instruction is coded in the control information.

22. The system of claim 12, wherein the control information specifies a condition under which a control-flow change at an end of the instruction sequence should occur.

23. A method for use with a processor, comprising:
adding control information to an instruction sequence at compile time, the control information being added in the instruction sequence prior to a control-flow changing instruction;
extracting the control information from a buffer prior to the control information entering a pipeline of the processor; and
in hardware, using the control information at runtime (i) to predict an outcome of the control-flow changing instruction prior to fetching the control-flow changing instruction, the outcome comprising a path following the control-flow changing instruction, (ii) to fetch, without decoding the control-flow changing instruction, an instruction corresponding to the path, and (iii) to generate control signals for use during execution of the instruction corresponding to the path predicted by the control information.

24. The method of claim 23, wherein the control information comprises an instruction that is used to enhance different types of operation of the processor.

25. The method of claim 24, wherein the different types of operation comprise power and performance.

26. The method of claim 25, wherein the control information is usable to select between different types of branch prediction.

27. A system for use with a processor, comprising:
a machine to execute a compiler to add control information to an instruction sequence at compile time, the compiler for adding the control information in the instruction sequence prior to a control-flow changing instruction; and
microarchitecture:
(i) to extract the control information from a buffer prior to the control information entering a pipeline of the processor, and
(ii) to use the control information at runtime:
(a) to predict an outcome of the control-flow changing instruction prior to fetching the control-flow changing instruction, the outcome comprising a path following the control-flow changing instruction,
(b) to fetch, without decoding the control-flow changing instruction, an instruction corresponding to the path; and
(c) to generate control signals for use during execution of the instruction corresponding to the path predicted by the control information;
wherein the microarchitecture comprises hardware.

28. The system of claim 27, wherein the control information comprises an instruction that is used to enhance different types of operation of the processor.

29. The system of claim 28, wherein the different types of operation comprise power and performance.

30. The system of claim 27, wherein the control information is usable to select between different types of branch prediction.

31. A method for use with a processor, comprising:
adding control information to an instruction sequence at compile time, the control information being added in the instruction sequence prior to a control-flow changing instruction; and
in hardware, using the control information at runtime (i) to predict an outcome of the control-flow changing instruction, the outcome being predicted without requiring fetching of the control-flow changing instruction, the outcome comprising a path following the control-flow changing instruction, (ii) to fetch, without decoding the control-flow changing instruction, an instruction corresponding to the path, and (iii) to generate control signals for use during execution of the instruction corresponding to the path predicted by the control information.

32. The method of claim 31, wherein the control information comprises static information.

33. The method of claim 31, wherein the control information comprises an instruction that is used to enhance different types of operation of the processor.

34. The method of claim 33, wherein the different types of operation comprise power and performance.

35. The method of claim 31, wherein the control information is usable to select between different types of branch prediction systems.

36. The method of claim 31, wherein the control-flow changing instruction comprises a branch instruction; and
wherein predicting the outcome comprises resolving the branch instruction.

37. The method of claim 31, further comprising:
performing an analysis of the instruction sequence at compile time in order to generate the control information.

38. The method of claim 31, wherein the control information identifies a position of the control-flow changing instruction in the instruction sequence.

39. A system for use with a processor, comprising:
a machine to execute a compiler to add control information to an instruction sequence at compile time, the control information being added in the instruction sequence prior to a control-flow changing instruction; and
a microarchitecture to use the control information at runtime (i) to predict an outcome of the control-flow changing instruction, the outcome being predicted without requiring fetching of the control-flow changing instruction, the outcome comprising a path following the control-flow changing instruction, (ii) to fetch, without decoding the control-flow changing instruction, an instruction corresponding to the path, the microarchitecture comprising hardware, and (iii) to generate control signals for use during execution of the instruction corresponding to the path predicted by the control information.

40. The system of claim 39, wherein the control information comprises static information.

41. The system of claim 39, wherein the control information comprises an instruction that is used to enhance different types of operation of the processor.

42. The system of claim 41 wherein the different types of operation comprise power and performance.

43. The system of claim 39, wherein the control information is usable to select between different types of branch prediction systems.

44. The system of claim 39, wherein the control-flow changing instruction comprises a branch instruction; and
wherein predicting the outcome comprises resolving the branch instruction.

45. The system of claim 39, wherein the compiler is configured to perform an analysis of the instruction sequence at compile time in order to generate the control information.

46. The system of claim 39, wherein the control information identifies a position of the control-flow changing instruction in the instruction sequence.

47. A method for use with a processor, comprising:
adding control information to an instruction sequence at compile time, the control information being added in the instruction sequence prior to a control-flow changing instruction, the control-flow changing instruction for changing a control flow of a computer program at runtime, and compile-time comprising a time during which program code is translated into the instruction sequence;
at compile-time, removing the control-flow changing instruction from the instruction sequence; and
in hardware, using the control information at runtime to predict an outcome of the control-flow changing instruction that was removed at compile-time, the outcome comprising a target of the control-flow changing instruction that includes a path following the control-flow changing instruction.

48. The method of claim 47, further comprising determining, without decoding the control-flow changing instruction, from where to fetch an instruction corresponding to the path.

49. A system for use with a processor, comprising:
a machine to execute a compiler (i) to add control information to an instruction sequence at compile time, the control information being added in the instruction sequence prior to a control-flow changing instruction, the control-flow changing instruction for changing a control flow of a computer program at runtime, and compile-time comprising a time during which program code is translated into the instruction sequence, and (ii) to remove the control-flow changing instruction from the instruction sequence at compile time; and
microarchitecture to use the control information at runtime to predict an outcome of the control-flow changing instruction that was removed at compile-time, the microarchitecture comprising hardware, the outcome comprising a target of the control-flow changing instruction that includes a path following the control-flow changing instruction.

50. The system of claim 49, wherein the microarchitecture is configured to use the control information at runtime to fetch, without decoding the control-flow changing instruction, an instruction corresponding to the path.

* * * * *

UNITED STATES PATENT AND TRADEMARK OFFICE
CERTIFICATE OF CORRECTION

PATENT NO. : 8,607,209 B2  Page 1 of 1
APPLICATION NO. : 11/037663
DATED : December 10, 2013
INVENTOR(S) : Chheda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1099 days.

Signed and Sealed this
Twenty-third Day of May, 2017

Michelle K. Lee
*Director of the United States Patent and Trademark Office*